United States Patent [19]
Williams, Jr.

[11] Patent Number: 5,923,008
[45] Date of Patent: Jul. 13, 1999

[54] ROTARY SWITCH FOR MULTIPLE CIRCUITS

[76] Inventor: Walter Gustave Williams, Jr., P.O. Box 1422, La Porte, Tex. 77571

[21] Appl. No.: 09/027,059

[22] Filed: Feb. 20, 1998

[51] Int. Cl.⁶ .................................................. H01H 19/58
[52] U.S. Cl. ........................ 200/14; 200/11 D; 200/11 R
[58] Field of Search ................................. 200/1 R, 11 R, 200/14, 11 A–11 TW, 18, 1 A, 564, 570, 571, 336; 307/43, 48, 63, 71, 77, 80, 85, 66

[56] References Cited

U.S. PATENT DOCUMENTS

| | | | |
|---|---|---|---|
| 2,908,777 | 10/1959 | Brown | 200/11 |
| 3,718,848 | 2/1973 | Hines | 320/7 |
| 3,753,076 | 8/1973 | Zelina | 321/45 R |
| 4,112,274 | 9/1978 | Pigman et al. | 200/146 R |
| 4,246,453 | 1/1981 | Marchese et al. | 200/11 R |
| 4,493,954 | 1/1985 | Kimmel et al. | 200/11 R |
| 4,916,263 | 4/1990 | Ichigo | 200/11 DA |
| 4,959,554 | 9/1990 | Underwood, IV et al. | 307/38 |
| 5,051,548 | 9/1991 | Underwood, IV et al. | 200/11 D |
| 5,497,066 | 3/1996 | Drouillard et al. | 320/7 |

*Primary Examiner*—Michael A. Friedhofer

[57] ABSTRACT

A multi-position rotary switch for switching among three power sources or batteries to maintain at least one of the power sources or batteries in service while switching among positions providing separate service from each of the three power sources or batteries and service of two power sources in series while the other power sources is in service which includes a stator of suitable insulating material having a series of discrete electrical conductor segments in two concentric circular paths with the positive terminal of each of the three power sources connected to a discrete segment and with the negative terminals of two of the three power sources connected to a discrete segment and the negative terminal of the other of the three power sources connected to a discrete segment; the discrete segments are arranged in a pattern such that the switch rotor having three radial shorting conductor bars for intermittently coupling discrete segments between the two circular paths upon sequential rotation from off through four positions to off again will provide separate outputs from each of the three power sources and separate output from one power source along with series output across the other two power sources.

18 Claims, 5 Drawing Sheets

POSITION TWO

POSITION THREE

POSITION FOUR

OFF

POSITION FOUR

ROTARY SWITCH FOR MULTIPLE CIRCUITS

BACKGROUND OF THE INVENTION

This invention relates to electrical switches having a multiple of power sources or batteries connected thereto for transferring electrical energy from such sources to multiple electric circuits. More particularly, the invention relates to rotary switches capable of delivering power from sources in series or parallel for electrical circuits requiring different power levels at various voltages.

In various applications it is desirable to provide power sources at different voltage levels. In the sports of boating and fishing boats used by many sportsmen require several batteries for various purposes and various voltage levels. For example, some operations require 24 volts and other electrical circuits require 12 volts. Thus, it is desirable to be able to switch the use of the batteries to serial or parallel operation or use a single battery.

It is best for sportsmen to have access to several batteries on their boat, especially in isolated areas where one battery may go dead and the sportsman not having a spare battery. Likewise, it is desirable to be able to charge a battery that is not being used to provide electrical power for operations of the vessel.

U.S. Pat. No. 5,233,282 issued to Iwashita, discloses a battery system for use in connection with a pair of marine propulsion units, one of which is powered by an internal combustion engine that drives a generator and the other of which is actuated by an electric motor. A pair of actuating batteries are in circuit with the electric motor and the generator and are adapted to selectively provide power to the electric motor or receive a charge from the generator in response to a main switch which is also used to control the starting of the internal combustion engine. A pair of contact relays, responsive to the main switch, are used to adjust the circuitry of the battery system so that the actuating batteries are either connected in parallel in the charging state or connected in series in the actuating state.

U.S. Pat. No. 4,959,554 issued to Underwood, IV, et al, discloses an electric switch having a disc which is rotatable to any of several indexed positions, the disc having two generally semicircular conductive sectors rigidly attached to the disc and electrically insulated from each other; a plurality of stationary terminals, one of which is in continuous sliding contact with one of the sectors, one of which is in continuous sliding contact with the other sector, and the remaining terminals are in discontinuous sliding contact with one or the other of the sectors; the sectors being shaped to eliminate electrical contact with selected terminals at selected indexed positions of the disc.

U.S. Pat. No. 5,497,066 issued to Drouillard, et al, discloses a battery booster for wheel chair electrical system powered by two 12 volt batteries that includes a standard socket for receiving 12 volts of power from a vehicle cigarette lighter. A switch operated either manually or automatically is provided for selectively connecting the batteries in series for operation or parallel for charging.

U.S. Pat. No. 2,908,777 issued to Brown, shows an electric switch having a rotor and a stator. The stator has a plurality of terminal segments extending through openings. The rotor is biased against the stator with metal conductors mounted in the rotor and may be rotated to engage contact segments. The switch may be used to reverse a fan motor.

None of the foregoing Patents suggest a rotary switch for multiple circuits controlling at least three batteries to provide at least one battery charging from a marine engine while providing electrical power for operating other 12 volt and 24 volt electrical systems.

SUMMARY OF THE INVENTION

It is an object of the present invention to provide a rotary switch for multiple circuits wherein a selection of power sources or batteries may be in service and charging or providing 12 volt or 24 volt power to operate electrical equipment. For example, a 12 volt output for starting and operating a marine engine and providing a 12 volt power source to auxiliary equipment such as lighting, radios, etc. and at the same time providing 24 volt power to other electrical circuits requiring 24 volt service.

In accordance with the present invention, the rotary switch for multiple circuits includes a circular stator as an integral part of the switch body which has a series of concentric, but discontinuous electrical conductor segments on the face of the stator. The conductor segments provide a positive common contact and a negative common contact available for three power sources or batteries for outputs to user connections. The positive terminal of each of the three batteries is connected to a separate electrical conductor segment with two of the three negative battery terminals connected to one electrical conductor segment and the third connected to a separate electrical conductor segment. The stator also includes a 24 volt electrical conductor segment. Also, the conductor segment of the positive common contact is discontinuous on the face of the stator but with a sector at the back of the stator forms a continuous electrical conductor segment. Likewise, the conductor segment of the single positive contact of one battery is discontinuous on the face of the stator, but with a sector at the back of the stator forms a continuous electrical conductor segment. The multiple positions of the switch would be provided in each 120° angular rotation of the switch, thus for five switch positions each position would have 24° of angular displacement from the next positions.

The rotor contains three equal angular shorting bars which are biased against the stator to make electric connections at various angular positions which provide for switching to 12 volt power output from three different power sources or batteries, an angular position for providing 12 volt and 24 volt power sources or batteries and an angular position where all of the power sources or batteries are disconnected from all electrical circuits and no electrical power is being provided.

When switching from one to another of the three 12 volt power sources or batteries, the switch is designed to connect the second battery positive terminal before it disconnects the first battery positive terminal, and likewise, connects the third battery positive terminal before it disconnects the second battery positive terminal, thus maintaining uninterrupted power to all electrical circuits requiring 12 volt electrical power. However, when making the electrical connection to provide 12 volt and 24 volt power sources, the first power source or battery positive terminal connects before the third power source or battery positive terminal disconnects and then the positive terminal of the second power source or battery connects to the negative terminal of the third power source or battery to obtain the 24 volt power source across the second and third batteries in series while the first power source provides 12 volt electrical power.

In another arrangement, to avoid having a sector of the positive common electrical conductor segment and a sector of the positive electrical conductor segment on the back of the rotor, the switch would utilize the three rotor shorting bars one shorting bar would be 135° from either one of the other two which would have a 60° angular displacement between those two. Each position of the switch would have an angular displacement of 30° from the other two positions, thus the switch would rotate from off to three positions, each providing a 12 volt power source or battery and position four providing 24 volt and 12 volt power sources through an angular distance of 120°. In such an arrangement the switch would be rotated counter-clockwise 120° and clockwise 120° to go from off to position four and back to off.

DESCRIPTION OF PREFERRED EMBODIMENT

Figure 1A:
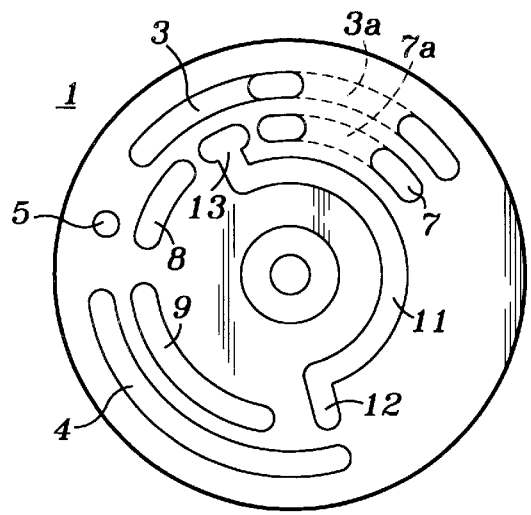
FIG. 1a—Illustrates the electrical layout of the stator with concentric metallic electrical connecting segments.
Figure 1B:
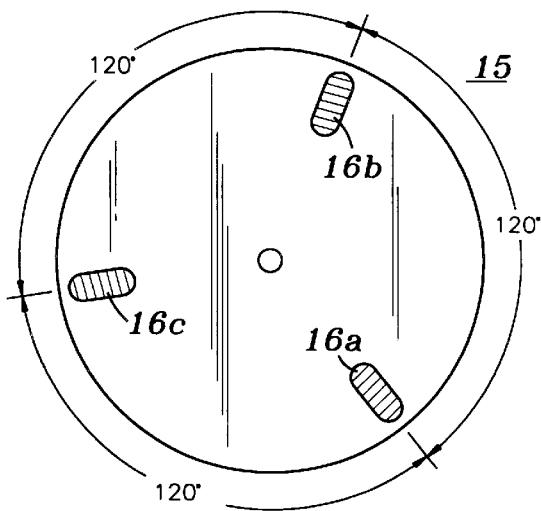
FIG. 1b—Depicts the rotor shorting bars at equal angular positions.

Referring to FIGS. 1a and 1b, the switch 10 has a stator 1 made of suitable insulating material. The stator 1 has arcuate segment 3, arcuate segment 4 and arcuate segment 5 spaced around stator 1 on the same circular path. Arcuate segment 7, arcuate segment 8 and arcuate segment 9 are spaced on the same circular path radially inward of the circular path of arcuate segment 3, arcuate segment 4 and arcuate segment 5. Arcuate segment 11 is spaced on a circular path radially inward of the circular path of arcuate segment 7, arcuate segment 8 and arcuate segment 9; however, arcuate segment 11 has radial finger 12 which extend into the circular path of arcuate segments 7, 8 and 9 intermediate arcuate segment 9 and arcuate segment 8 and radial paw 13 which extends into circular path of arcuate segments 7, 8 and 9 intermediate arcuate segment 7 and arcuate segment 8. Arcuate segment 3 has a sector 3a on the back of the stator 1 and arcuate segment 7 has a sector 7a on the back of stator 1. Rotor 15 has three shorting bars 16a, 16b and 16c equal angularly fixed to rotor 15 as more fully illustrated in FIG. 7. All of the arcuate segments are formed of suitable electrical conductor material such as copper.

Figure 8:
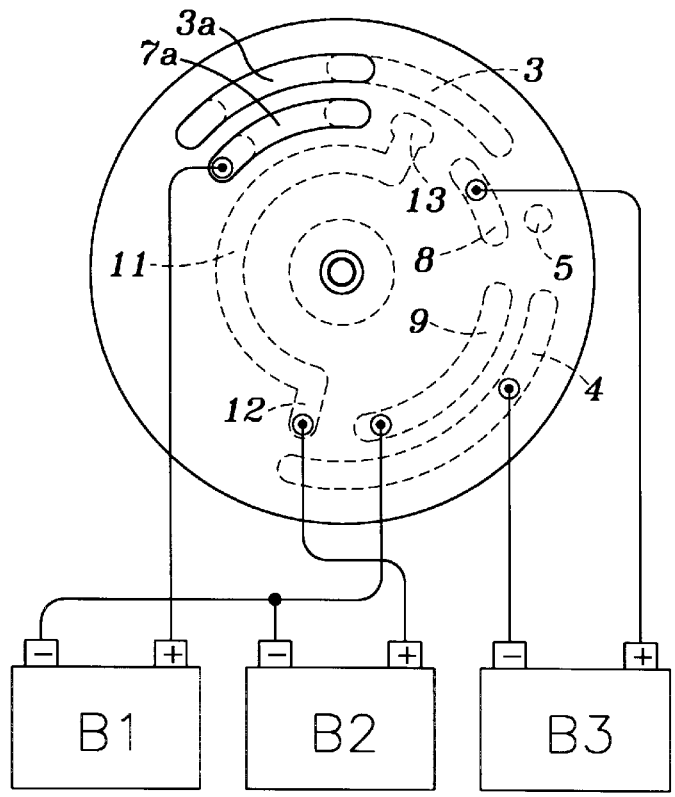
FIG. 8—Depicts the battery connections on the back of the stator to the electrical conductor segments.

Considering FIG. 8, battery B1 has its positive terminal connected to arcuate segment 7 and its negative terminal connected to arcuate segment 9. Battery B2 has its positive terminal connected to arcuate segment 11 and its negative terminal connected to arcuate segment 9 the same as battery B1. Battery B3 has its positive terminal connected to arcuate segment 8 and its negative terminal connected to arcuate segment 4.

Referring now to FIGS. 2, 3, 4, 5a and 6, various positions of the switch are shown. With the switch in the off position as in FIG. 2, shorting bar 16b is positioned on the face of the stator over sectors 3a and 7a, hence make no connection between arcuate segments 3 and 7. Shorting bar 16c connects arcuate segment 4 to arcuate segment 9 which is connected to the negative common output buss 40 for batteries B1 and B2 and buss 41 for battery B3. Shorting bar 16a is not in contact with any arcuate segment.

Figure 3:
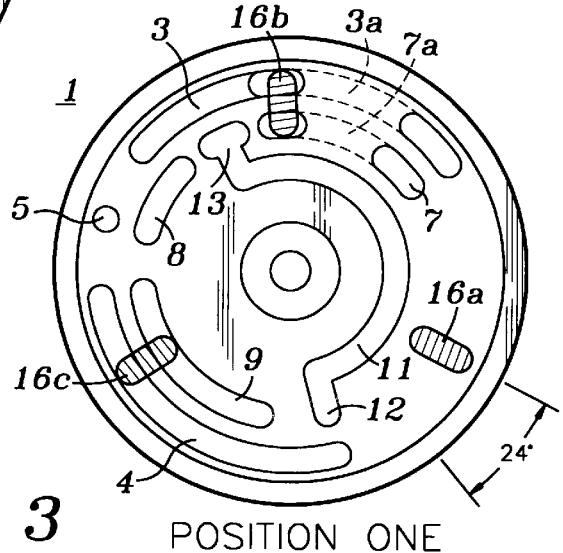
FIG. 3—Illustrates the rotor shorting bars engaging the stator in position 1.
Figure 9:
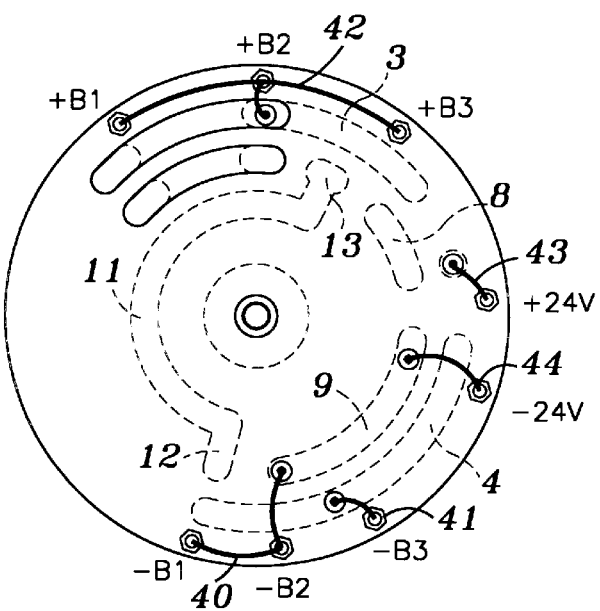
FIG. 9—Illustrates the output terminals for electrical loads connected to the back of the stator to supply power from the batteries.

Referring next to FIGS. 3, 8 and 9, the switch in position one shows shorting bar 16b connecting arcuate segment 7 with arcuate segment 3, thus it connects the positive terminal of battery B1 through arcuate segment 7 to arcuate segment 3 which is attached to the positive common output buss 42 for batteries B1, B2 and B3. Likewise, shorting bar 16c maintains contact between arcuate segments 4 and 9, thus connecting the negative of battery B1 to the common negative output buss 40 of battery B1.

Figure 4:
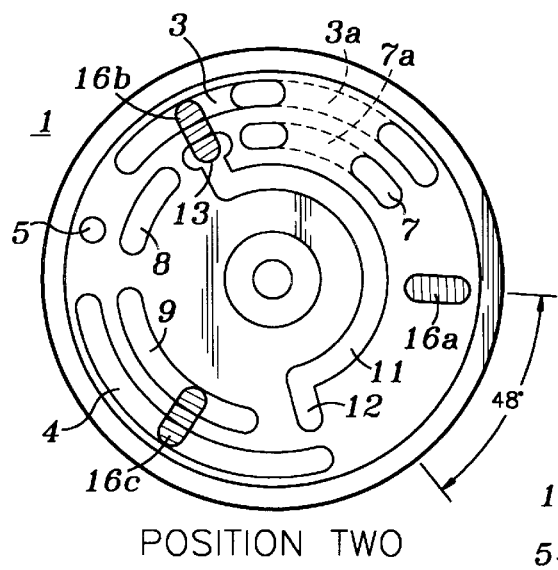
FIG. 4—Illustrates the rotor shorting bars engaging the stator in position 2.
Figure 10:
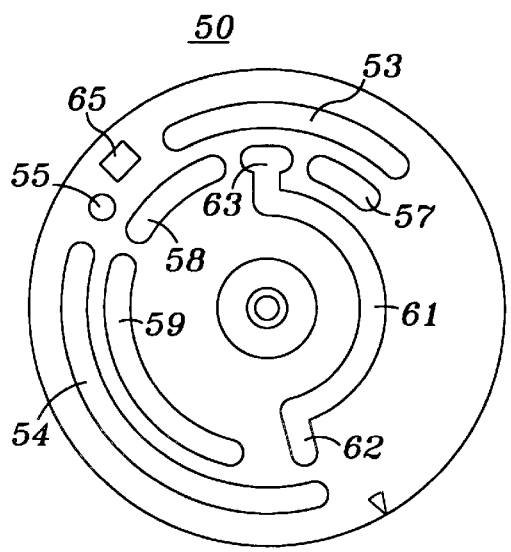
FIG. 10—Illustrates the stator for a modified version of the rotary switch.
Figure 11:
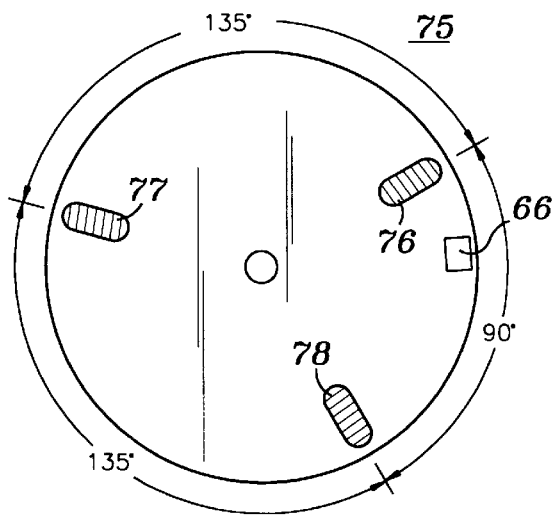
FIG. 11—Illustrates a rotor in which the shorting bars are not equally angularly spaced.

Referring to FIGS. 4, 9 and 10, the switch in position two, arcuate segment 3 has been connected to radial paw 13 by shorting bar 16b and disconnected from arcuate segment 7 thus, connecting the positive terminal of battery B2 through arcuate segment 11 to arcuate segment 3 which is the common positive output buss 42 for batteries B1, B2 and B3. Shorting bar 16c continues to maintain contact between arcuate segments 4 and 9 which are connected to the negative output buss 41 for batteries B1 and B2, as well as buss 41 for battery B3. The shorting bar 16a is not in contact with any arcuate segment.

Figure 5A:
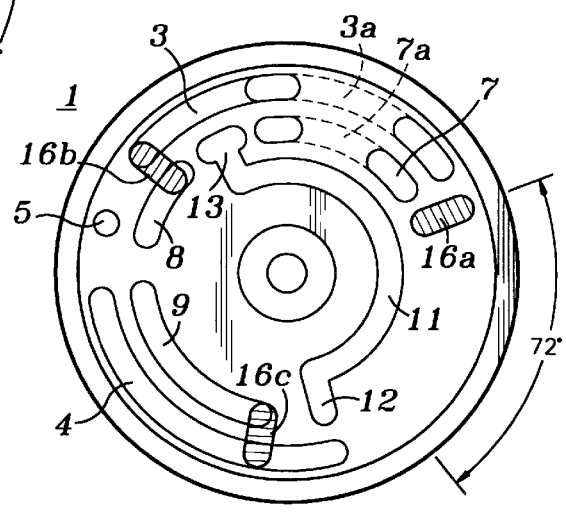
FIG. 5a—Illustrates the rotor shorting bars engaging the stator in position 3.
Figure 5B:
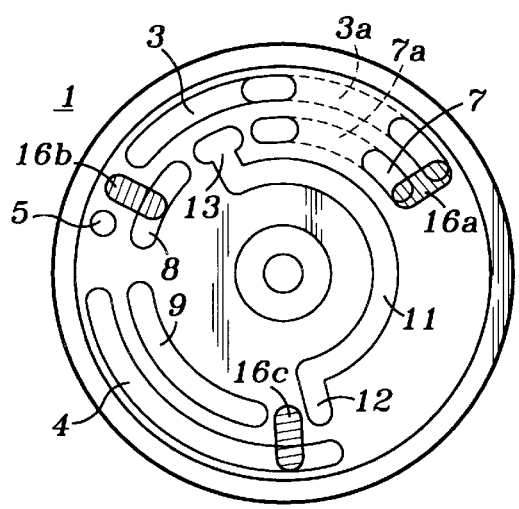
FIG. 5b—Illustrates to rotor shorting bars intermediate stator positions three and four.

Referring to FIGS. 5a, 9 and 10, the switch in position three, arcuate segment 8 has been connected to arcuate segment 3 by shorting bar 16b and then arcuate segment 11 has been disconnected from arcuate segment 3. In position three, the positive terminal of battery B3 is connected to arcuate segment 8 and by shorting bar 16b to arcuate segment 3 which is connected to the positive common output buss 42 for batteries B1, B2 and B3. Shorting bar 16c maintains the negative terminal of battery B3 connected through arcuate segment 4 to arcuate segment 9 thus providing a common negative output busses 40 and 41 for batteries B1, B2 and B3. Shorting bar 16a is out of contact with any arcuate segment.

Referring now to FIGS. 5b, 6, 9 and 10, switch position four provides both 12 and 24 volt power from batteries B1, B2 and B3 which are all in service in this position. Going from position three to position four, shorting bar 16a connects arcuate segment 7 to arcuate segment 3, thus connecting the positive terminal of battery B1 to the positive common output buss 42 of batteries B1, B2 and B3. Then upon further counter-clockwise rotation shorting bar 16b no longer connects arcuate segment 3 with arcuate segment 8 and shorting bar 16c no longer connects arcuate segment 9 with arcuate segment 4 and then after full rotation to position four shorting bar 16b connects arcuate segment 8 to arcuate segment 5 and shorting bar 16c connects arcuate segment 4 with radial finger 12 of arcuate segment 11. In this position four the positive terminal of battery B2 is connected through radial finger 12 of arcuate segment 11 to arcuate segment 4 which is connected to the negative terminal of battery B3 and the positive terminal of battery B3 is connected through arcuate segment 8 by shorting bar 16b to arcuate segment 5. Arcuate segment 5 is connected to the positive 24 volt output terminal 43 and the negative terminal of battery B2 is connected to arcuate segment 9 which is also connected to the negative 24 volt output terminal 44.

Figure 7:
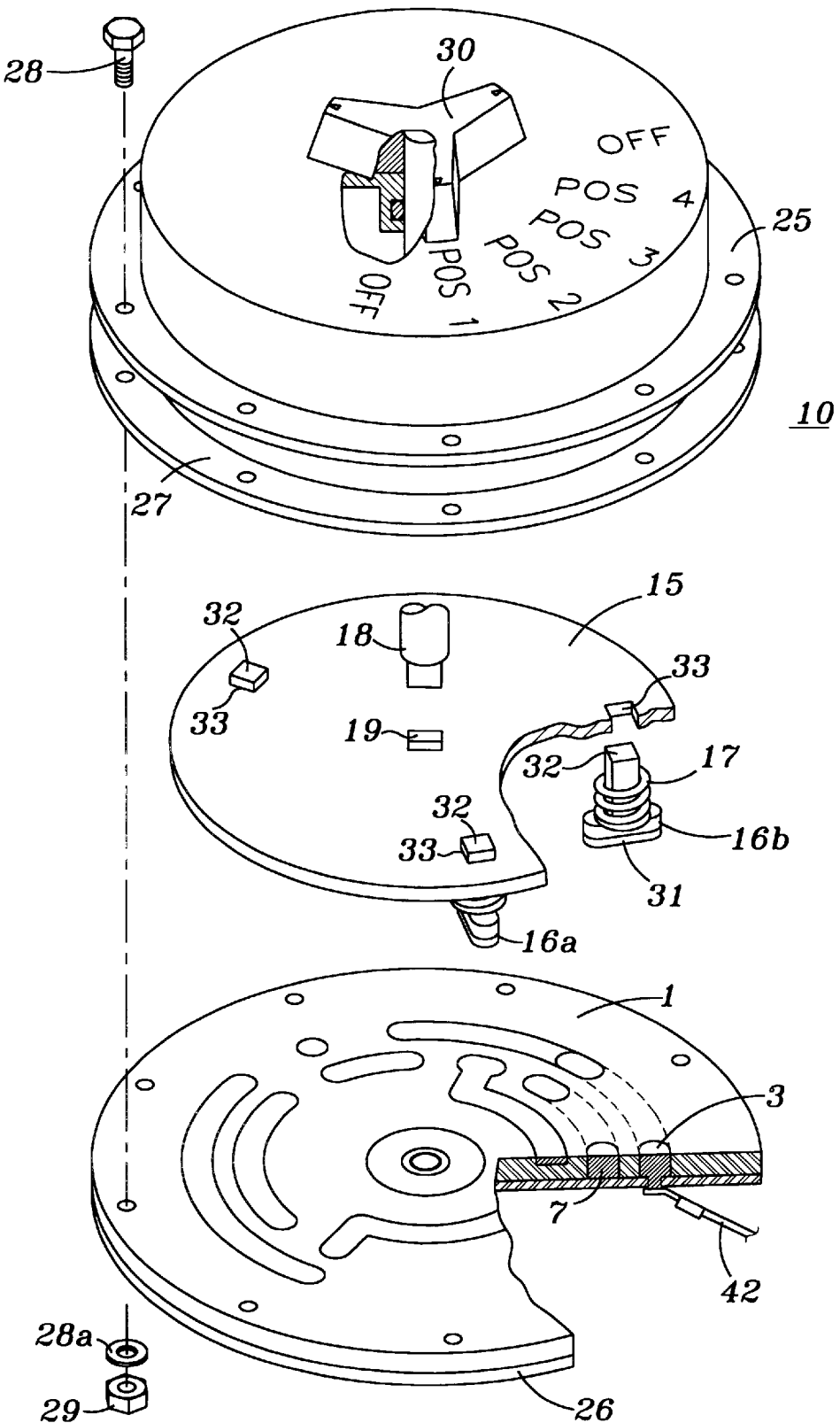
FIG. 7—A prospective drawing of the switch partly broken away to illustrate the electrical continuity between the front and back of the stator and the rotor detail.

Referring now to FIGS. 7 and 2b, the construction of arcuate segments 3 and 7 and shorting bar 16b of switch 10 is best seen. Switch 10 has a three corner knob 30 with a keyed shaft 17 which is attached by suitable means in slot 19 to rotate the rotor 15 with its shorting bars 16a, 16b and 16c. All of the shorting bars are of similar construction as shorting bar 16b. Shorting bar 16b has an oval metallic head 31 which makes contact with the various arcuate segments. Metallic head 31 is secured to square shaft 32 riding in square aperture 33 of rotor 15 and biased by a spring 17 against stator 1. Shorting bars 16a and 16c are constructed the same as shorting bar 16b. Switch 10 has a housing 25 which is secured to the stator housing 26 sealed by gasket 27 and secured by bolts 28, washer 28a and nuts 29.

Figure 2:
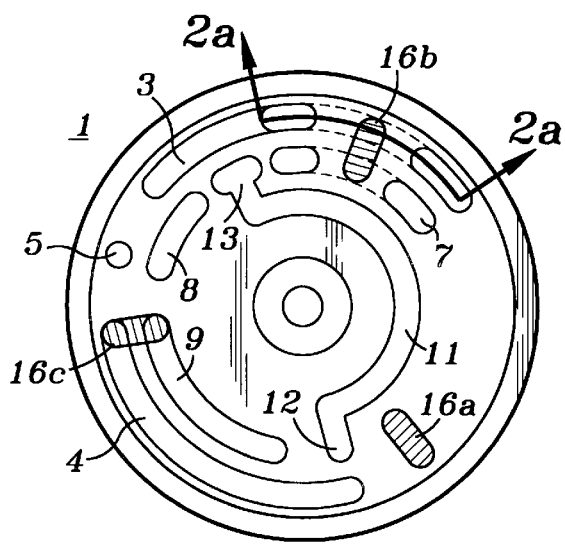
FIG. 2a—Illustrates the rotor shorting bars engaging the stator in the off position.
FIG. 2b—Is a sectional view taken along the arc 2a—2a in FIG. 2 which illustrates the continuity of the positive common contact.
Figure 2A:
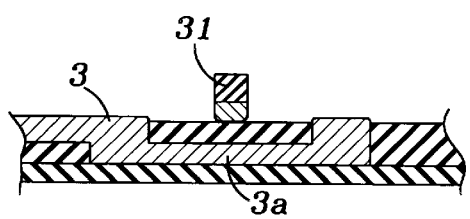

Referring to FIGS. 1 through 9, which illustrate the preferred embodiment of rotary switch 10, the operation of the rotary switch is herein described. Beginning with the switch 10 in the off position as illustrated in FIG. 2, the shorting bars 16a and 16b are out of contact with any arcuate segments and shorting bar 16c connects arcuate segment 4 with arcuate segment 9. Thus, the negative output of the batteries are connected; however, none of the positive terminals of the batteries are connected through the switch.

Figure 6:
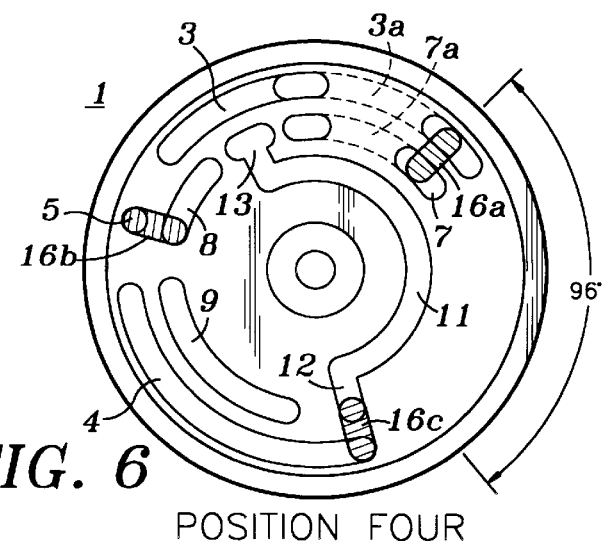
FIG. 6—Illustrates the rotor shorting bars engaging the stator in position 4.

If the rotor 15 is rotated clockwise from the off position in FIG. 2, the switch will be in position four as illustrated in FIG. 6, providing both 12 volt service across busses 42 and 40 and 24 volt service across terminals 43 and 44 of the switch 10. This is accomplished by shorting bar 16a coupling arcuate segment 7 to arcuate segment 3 which connects the positive terminal of battery B1 to the positive common output buss 42 of the switch 10, shorting bar 16b coupling arcuate segments 8 to arcuate segment 5 which connects the positive terminal of battery B3 to the positive 24 volt terminal 43 of switch 10, and the shorting bar 16c uncoupling arcuate segment 4 from arcuate segment 9 and then coupling radial finger 12 of arcuate segment 11 to arcuate segment 4 which connects the positive terminal of battery B2 to the negative terminal of battery B3. The negative terminal of battery B2 is connected to arcuate segment 9 which is connected to the negative output terminal 44 of the switch 10 to provide 24 volt output. Thus, the 24 volt supply is provided by the positive 24 volt terminal 43 attached to battery B3 and the negative terminal of battery B3 is connected to the positive terminal of battery B2 and the negative terminal of battery B2 is connected to the negative 24 volt terminal 44.

Rotating rotor 15 counterclockwise from the off position in FIG. 2 to position one in FIG. 3, then battery B1 will be providing 12 volt output through the switch 10 across the positive common output buss 42 and the negative common output buss 40. Arcuate segment 7 is coupled by shorting bar 16b to arcuate segment 3 which is connected to the positive common output buss 42 and the negative terminal of battery B1 is connected from arcuate segment 9 to negative output buss 40 of switch 10. In position one illustrated in FIG. 3 only battery B1 is in service.

Rotating rotor 15 counter-clockwise from position one to position two, shorting bar 16b maintains arcuate segment 7 coupled to arcuate segment 3 to keep battery B1 in service until shorting bar 16b couples radial paw 13 of arcuate segment 11 and arcuate segment 3, then arcuate segment 3 and arcuate segment 7 are uncoupled. Thus, battery B2 is placed in parallel service with battery B1 momentarily before rotor 15 is fully rotated to position two at which time only battery B2 is in service.

Rotating rotor 15 counter-clockwise from position two to position three, shorting bar 16b maintains radial paw 13 of arcuate segment 11 coupled to arcuate segment 3 to keep battery B2 in service until shorting bar 16b couples arcuate segment 8 to arcuate segment 3 and then radial paw 13 of arcuate segment 11 and arcuate segment 3 are uncoupled. Thus, both battery B2 and battery B3 are in parallel service momentarily before rotor 15 is fully rotated to position three at which time only battery B3 is in service.

When rotor 15 is rotated counter-clockwise from position three to position four, the shorting bar 16b coupling arcuate segment 3 to arcuate segment 8 is uncoupled and shorting bar 16c coupling arcuate segment 9 to arcuate segment 4 is uncoupled. At this angular position (see FIG. 5b) arcuate segment 8 connected to the positive terminal of battery B3 is not coupled to arcuate segment 3 and finger 12 of arcuate segment 11 connected to the positive terminal of battery B2 has not been coupled by shorting bar 16c to arcuate segment 4. However, arcuate segment 3 and 7 are coupled by the shorting bar 16a just prior to shorting bar 16b uncoupling arcuate segment 3 from arcuate segment 8, thus, battery B1 is providing 12 volt output and battery B3 is disconnected from 12 volt service prior to further rotation of rotor 15 so that shorting bar 16b couples arcuate segment 8 to arcuate segment 5 and shorting bar 16c couples finger 12 of arcuate segment 11 to arcuate segment 4 thus connecting battery B2 and battery B3 in series to provide 24 volt output.

Referring now to FIGS. 10, 11, 12, and 13, an alternate embodiment of the rotary switch is described. The stator 50 has arcuate segment 53, arcuate segment 54 and arcuate segment 55 near the outer edge of the stator on the same circular path. Arcuate segments 57, 58 and 59 are on the same circular path, but inbound of arcuate segments 53, 54 and 55. It should be noted that arcuate segments 53 and 57 are continuous on the front of the rotor unlike arcuate segments 3 and 7 of the preferred embodiment of the switch 10 (see FIG. 1a). The stator 50 has an arcuate segment 61 with radial finger 62 and radial paw 63 which are comparable to arcuate segment 11 and radial finger 12 and radial paw 13 illustrated in FIG. 1a. Rotor 75 has shorting bars 76, 77 and 78 of similar construction as shorting bars 16a, 16b and 16c. In this embodiment, stator 50 and rotor 75 replace stator 1 and rotor 15 of switch 10. The rotor 75 is constructed such that the angular displacement between shorting bar 76 and 78 is 60° and the angular displacement of shorting bar 77 is 135° from both shorting bars 76 and 78.

Figure 12:
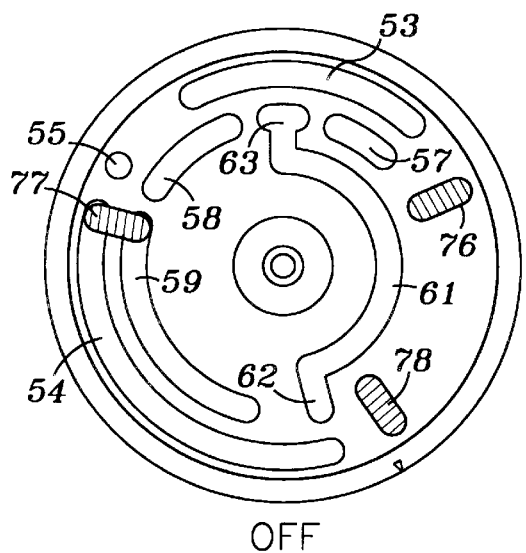
FIG. 12—Illustrates the position of the shorting bars in the off position.
Figure 13:
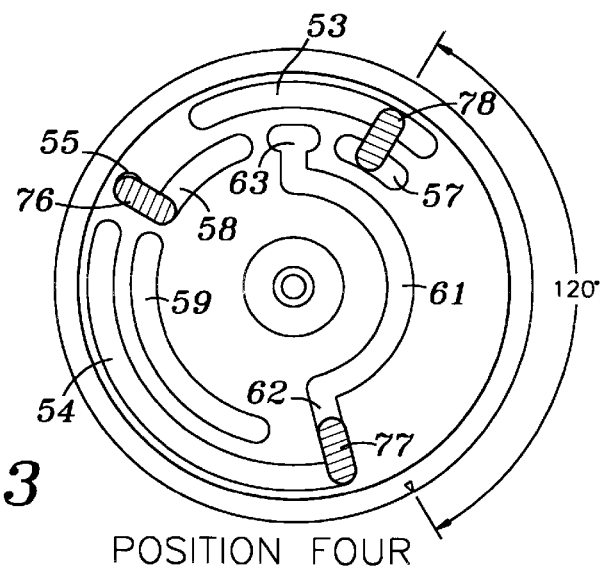
FIG. 13—Illustrates the position of the shorting bars placing two batteries in series with 12 and 24 volt outputs provided.

Since the alternate embodiment switch is similar to the preferred embodiment, only the off position and 24 volt output position are illustrated in FIGS. 12 and 13. It should be noted that rotor 75 rotates 30° between each position.

Referring to FIG. 12, the switch is in the off position. The shorting bar 77 is in contact with arcuate segments 54 and 59 which are connected to the negative terminals of batteries B1 and B2 and B3, respectively. Shorting bars 76 and 78 do not contact any arcuate segment.

Referring now to FIG. 13, position four of the modified switch 10 illustrates the 12 volt output from battery B1 and 24 volt output from batteries B2 and B3 connected in series. In order to provide simultaneous 12 volt and 24 volt output, shorting bar 76 couples arcuate segment 55 to arcuate segment 58 thus, connecting the positive terminal of battery B3 to the 24 volt positive output terminal 43 on the modified switch 10. The positive terminal of battery B2 is connected to arcuate segment 61. Shorting bar 77 couples radial finger 62 of arcuate segment 61 to arcuate segment 54 which is connected to the negative terminal of battery B3. The negative terminal of battery B2 is connected to arcuate segment 59 which is connected to the 24 volt negative output terminal 44 on the switch 10.

Referring to the alternate embodiment illustrated in FIGS. 10 through 13, the operation of the switch would be slightly different. If the alternate embodiment of stator and rotor 75 are used in modified switch 10, the switch 10 can only be rotated counter-clockwise from the off position to position four at which point the rotor is prevented from further counter-clockwise rotation by cooperating stops 55 on stator 50 and 66 on rotor 75. The operation of stator 50 and rotor 75 are similar in function as stator 1 and rotor 15. Thus, rotating rotor 75 counter-clockwise from the off position to position one the shorting bar 76 would couple arcuate segment 53 and 57 and shorting bar 77 would continue to couple arcuate segment 54 to arcuate segment 59. Upon continued rotation counter-clockwise of rotor 75, shorting bar 76 will couple arcuate segment 53 and finger 63 of arcuate segment 61 just prior to shorting bar 76 uncoupling arcuate segment 57 from arcuate segment 53. Further counter-clockwise rotation of rotor 75 towards position four, shorting bar 76 couples arcuate segment 53 to arcuate segment 58 before uncoupling finger 63 of arcuate segment 61 from arcuate segment 53. Further counter-clockwise rotation of rotor 75 towards position four illustrated in FIG. 14 shorting bar 78 couples arcuate segment 53 to arcuate segment 57 prior to shorting bar 76 uncoupling arcuate segment 53 from arcuate segment 58. While shorting bar 77 is uncoupling arcuate segment 54 from arcuate segment 59 at this angular position only battery B1 is in service. Upon complete rotation to position four shorting bar 76 couples arcuate segment 55 to arcuate segment 58 and shorting bar 77 couples arcuate segment 54 to finger 62 of arcuate segment 61 thus placing battery B2 and battery B3 in series to provide 24 volt output.

What is claimed is:

1. A multi-position rotary switch for switching at least three power sources of equal voltage having positive terminals and negative terminals among positions providing separate service from each of the three power sources and service of two of the three power sources in series while the other of the three power sources is in service comprising:

a stator having a series of concentric discrete conductor segments with the positive terminal of each of the three power sources connected to one of a first, second and third discrete conductor segments of the series of concentric discrete conductor segments, and with the negative terminals of two of the three power sources connected to a fourth discrete conductor segment of the series and the negative terminal of the other of the three power sources connected to a fifth discrete conductor segment of the series;

a rotor having three radial conductor bars spaced angularly thereabout for coupling the concentric discrete conductor segments;

(a) in an off position where none of the first, second and third discrete segments are coupled to a common positive output terminal and the fourth discrete segment is coupled to a first negative output terminal and to the fifth discrete segment which is coupled to a second negative output terminal;

(b) in a first position where only the first discrete segment is coupled to the common positive output terminal and the fourth and fifth discrete segments remain coupled together and to the first and second negative output terminals, respectively;

(c) in a second position where only the second discrete segment is coupled to the common positive output terminal and the fourth and fifth discrete segments remain coupled together and to the first and second negative output terminals, respectively;

(d) in a third position where only the third discrete segment is coupled to the common positive output terminal and the fourth and fifth discrete segments remain coupled together and to the first and second negative output terminals, respectively; and (e) in a fourth position where the first discrete segment is coupled to the common positive output terminal and the fourth discrete segment is coupled to the first negative output terminal and a negative series output terminal, the second discrete segment is coupled to the fifth discrete segment, and the third discrete segment is coupled to a positive series output terminal.

2. The multi-position switch of claim 1 wherein the three radial conductor bars are equiangularly spaced about the rotor.

3. The multi-position switch of claim 2 wherein during clockwise rotation of the stator from the off position the switch is off until the fourth position and the first positions are attained, the fourth position is discontinued and the first position is continued until the third position is attained, the third position is continued until the second position is attained, the second position is continued until the first position is re-attained.

4. The multi-position switch of claim 1 wherein the three power sources are batteries.

5. The multi-position switch of claim 1 wherein one of the three radial conductor bars is angularly displaced 135° from the other two radial conductor bars.

6. The multi-position switch of claim 1 wherein the concentric discrete conductor segments are made of copper and insulated from each other.

7. The multi-position switch of claim 6 wherein during counter-clockwise rotation of the stator from the off position the switch is off until the first position is attained, the first position is continued until the second position is attained, the second position is continued until the third position is attained, and the third position is continued until the first position is re-attained and thereafter the fourth position is attained.

8. A multi-position rotary switch for switching at least three power sources of equal voltage having positive terminals and negative terminals among positions providing separate service from each of the three power sources and service of two of the three power sources in series while the other of the three power sources is in service comprising:

a stator having a series of discrete conductor segments in two concentric circular paths with the positive terminal of each of the three power sources connected to one of a first, second and third separate discrete conductor segments of the series, and with the negative terminals of two of the three power sources connected to a fourth discrete conductor segment of the series and the negative terminal of the other of the three power sources connected to a fifth discrete conductor segment of the series, the discrete segments arrange in a pattern where sequentially linking the discrete segments between the two concentric circular paths each of the three power source is sequentially separately connected to a positive output terminal and a negative output terminal and one of the three power source is separately connected to the positive output terminal and the negative output terminal while the other two of the three power sources are linked in series to a positive series output terminal and a negative series output terminal; and a rotor having three radial conductor bars angularly spaced thereabout for sequentially linking the various discrete segments in one of the two concentric circular paths with the discrete segments in the other of the two concentric circular path.

9. The multi-position switch of claim 8 wherein the three power sources are batteries.

10. The multi-position switch of claim 8 wherein the three radial conductor bars are equiangularly spaced about the rotor.

11. The multi-position switch of claim 8 wherein one of the three radial conductor bars is angularly displaced 135° from the other two radial conductor bars.

12. The multi-position switch of claim 8 wherein the concentric discrete conductor segments are made of copper and insulated from each other.

13. The multi-position switch of claim 8 wherein during counter-clockwise rotation of the stator from the off position the switch remains off until the first position is attained, the first position is continued until the second position is attained, the second position is continued until the third position is attained, and the third position is continued until the first position is re-attained and thereafter the fourth position is attained.

14. A multi-position rotary switch for switching at least three power sources of equal voltage having positive terminals and negative terminals among positions providing separate service from each of the three power sources and service of a pair of the three power sources in series while the other of the three power sources is in service comprising:

a stator having a series of discrete conductor segments in two concentric circular paths with the positive terminal of each of the three power sources connected to one of a first, second and third discrete conductor segments of the series, and with the negative terminals of two of the three power sources connected to a fourth discrete conductor segment of the series and the negative terminal of the other of the three power sources connected to a fifth discrete conductor segment of the series, the discrete conductor segments arranged in a pattern where sequentially linking of the discrete conductor segments between the two concentric circular paths, the positive terminals of the three power sources are initially unconnected to a positive output terminal and the negative terminals of the two of the three power sources connected to the fourth discrete conductor segment and the negative terminal of the other of the three power sources connected to the fifth discrete conductor segment are connected to a first negative output terminal and second negative output terminal, respectively, and to each other; then the positive terminal of each of the three power sources is sequentially and separately connected to the positive output terminal and the negative terminal of each of the three power sources remains connected to the first and second negative output terminals and to each other; then the positive terminal and the negative terminal of the one of the three power sources are separately connected to the positive output terminal and the first negative output terminal, respectively, while the pair of the three power sources are linked in series with the negative terminal of one of the pair connected through the fourth discrete segment to a negative series output terminal; the positive terminal of the one of the pair coupled to the fifth discrete segment connected to the negative terminal of the other of the pair; and the positive terminal of the other of the pair connected to a sixth discrete conductor segment coupled to a positive series output terminal; and a rotor having three radial conductor bars spaced angularly thereabout for sequentially linking the discrete segments in the first circular path with the discrete segments in the second circular path.

15. The multi-position switch of claim 14 wherein the three radial conductor bars are equiangularly spaced about the rotor.

16. The multi-position switch of claim 14 wherein the three power sources are batteries.

17. The multi-position switch of claim 14 wherein one of the three radial conductor bars is angularly displaced 135° from the other two radial conductor bars.

18. The multi-position switch of claim 14 wherein the concentric discrete conductor segments are made of copper and insulated from each other.

* * * * *